US006996172B2

(12) United States Patent
Ishtiaq et al.

(10) Patent No.: US 6,996,172 B2
(45) Date of Patent: Feb. 7, 2006

(54) METHOD AND STRUCTURE FOR SCALABILITY TYPE SELECTION IN DIGITAL VIDEO

(75) Inventors: Faisal Ishtiaq, Chicago, IL (US); Aggelos K. Katsaggelos, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 628 days.

(21) Appl. No.: 10/027,426

(22) Filed: Dec. 21, 2001

(65) Prior Publication Data
US 2003/0118096 A1 Jun. 26, 2003

(51) Int. Cl.
H04N 7/12 (2006.01)
(52) U.S. Cl. .............................. 375/240.1; 375/240.11; 375/240.19
(58) Field of Classification Search ........... 375/240.01, 375/240.05, 240.1, 240.11, 240.19; 348/397.1, 348/398.1; 382/240; 725/88, 90, 102
See application file for complete search history.

(56) References Cited

U.S. PATENT DOCUMENTS 6,639,943 B1 * 10/2003 Radha et al. .......... 375/240.11
6,836,512 B2 * 12/2004 Van Der Schaar et al. ..................... 375/240.11
2002/0071486 A1 * 6/2002 Van Der Schaar et al. ..................... 375/240.01
2002/0181580 A1 * 12/2002 Van Der Schaar ..... 375/240.01
2003/0016752 A1 * 1/2003 Dolbear et al. ........ 375/240.16
2004/0062304 A1 * 4/2004 Dolbear et al. .......... 375/240.1

* cited by examiner

Primary Examiner—Vu Le

(57) ABSTRACT

A scalability type selection method and structure for hybrid SNR-temporal scalability that employs a decision mechanism capable of selecting between SNR and temporal scalability based upon desired criteria is disclosed. This method and structure utilizes models of the desired criteria such as the extent of motion between two encoded frames, the temporal distance between two encoded frames, the gain in visual quality achieved by using SNR scalability over temporal scalability, and the bandwidth available to the scaleable layer in deciding which form of scalability to use. Furthermore, the method and structure allows for control over the extent to which a certain type of scalability is used. By the selection of parameters used in the models, a certain type of scalability can be emphasized while another type of scalability can be given less preference. This invention not only allows the type of scalability to be selected but also to the degree to which the scalability will be used.

27 Claims, 3 Drawing Sheets

METHOD AND STRUCTURE FOR SCALABILITY TYPE SELECTION IN DIGITAL VIDEO

TECHNICAL FIELD

This invention relates the field of digital video scalability, and in particular to joint SNR and temporal scalability as applied to digital video image compression.

BACKGROUND OF THE INVENTION

In digital video applications, the availability of bandwidth is the overriding factor in the visual quality of the video. The less bandwidth that is available, the lower the quality of the video, while higher bandwidths allow for more spatial clarity and increased temporal resolution. To provide for an efficient means of transmitting and/or storing digital video data at varying quality levels, or equivalently at different encoded rates, video scalability is utilized.

Video scalability is a technique for encoding enrichment data in the form of enhancement layers that when combined with a lower rate base layer result in progressively higher quality video. It is a mechanism for providing varying levels of video quality using a single bitstream without having to re-encode the source for a particular bitrate. In doing so, it eliminates the need to store compressed video sequences at different quality levels. By using scalability, an efficient, single, encoded bitstream is capable of providing varying levels of quality as warranted by the user or connection speed.

Scalability works by adding enhancement layers to a lower rate base layer. As more and more enhancement layers are combined, the better the video quality becomes. Furthermore, because there is no need to re-encode the source for different rates and to store multiple versions of the same sequence, both computational resources and storage space are conserved. The enhancement in quality can be in the form of increased signal-to-noise ratio (SNR), temporal continuity, and/or spatial resolution. Scalability used to enhance the SNR quality of a frame is referred to as SNR scalability. Temporal scalability refers to scalability designed to increase the temporal resolution by increasing the encoded frame rate. Finally, spatial scalability is used to enhance the spatial resolution, or dimensions, of a frame.

International video coding standards such as MPEG-2 [ISO/IEC 13818-2 MPEG-2 Information Technology—Generic Coding of Moving Pictures and Associated Audio—Part 2: Video, 1995], MPEG-4 [ISO/IEC 14496-2 MPEG-4 Information Technology—Coding of Audio-Visual Objects: Visual (Draft International Standard) October 1997], and H.263 [ITU-T Recommendation H.263 Video Coding for Low Bitrate Communication, January 1998] all support one or more of the above forms of scalability. The two most recent standards, H.263 and MPEG-4, support all three forms of scalability as well as defining the syntax such that combinations of the three can be used. For example, in a three layer scaleable bitstream, two enhancement layers can be of different types of scalability, or two types of scalability can be merged into a single enhancement layer.

The general concept of SNR scalability is shown in FIG. 1 where enhancement layers added to the base layer provide a resulting frame with less distortions and artifacts. Techniques for SNR scalability can be based on the video coding standards [ITU-T Recommendation H.263 Video Coding for Low Bitrate Communication, January 1998], [D. Wilson and M. Ghanbari. Optimization of two-layer SNR Scalability for MPEG-2 Video. *Proceedings of the International Conference on Acoustics, Speech, and Signal Processing*, Vol. 4, Pages 2637–2640. IEEE 1997], or may be outside of the standards [L. P. Kondi. *Low Bitrate SNR Scalable Video Coding and Transmission*. Ph.D. Thesis, Northwestern University, December 1999], [J. DeLameillieure. Rate-distortion Optimal Thresholding in SNR Scalability Based on 2D Dynamic Programming. *Proc. SPIE Conf. On Visual Communications and Image Processing*, Vol. 2952, pages 689–698. SPIE 1996]. Within the standards, SNR scalability is achieved by re-encoding the difference (error) image between the source and transmitted frames. This error is re-quantized and re-encoded in an enhancement layer. In MPEG-4 a second method referred to as Fine Granularity Scalability (FGS) can be used to generate SNR enhancement layers. A technique for SNR scalability that is beyond the scope of the standards has been presented in [L. P. Kondi. *Low Bitrate SNR Scalable Video Coding and Transmission*. Ph.D. Thesis, Northwestern University, December 1999] and is based on a hybrid form of both spectral selection and successive approximation introduced in progressive JPEG. Here SNR scalability is accomplished by partitioning the quantized data into three layers. SNR scalability in MPEG-2 has been considered in [D. Wilson and M. Ghanbari. Optimization of two-layer SNR Scalability for MPEG-2 Video. *Proceedings of the International Conference on Acoustics, Speech, and Signal Processing*, Vol. 4, Pages 2637–2640. IEEE 1997] where a technique for optimization of SNR scalability at bitrates of 2 Mbps is presented. Within H.263 Lee et. al. in [ B. R. Lee, K. K. Park, and J. J. Hwang. H.263-based SNR Scalable Video Codec. *IEEE Trans. Consumer Electronics*, Vol. 43, pages 614–622, September 1997] formulate a two-layer SNR scalable video codec with the enhancement layer being quantized based on the human visual system (HVS). Finally, optimization techniques have also been presented for use with SNR scalability. In [J. DeLameillieure. Rate-distortion Optimal Thresholding in SNR Scalability Based on 2D Dynamic Programming. *Proc. SPIE Conf. On Visual Communications and Image Processing*, Vol. 2952, pages 689–698. SPIE 1996] DeLameillieure formulates SNR scalability based on an optimal thresholding of the DCT coefficients using 2-dimensional dynamic programming. While many techniques exist for achieving SNR scalability they are limited in that they only consider SNR scalability.

The second form of scalability is temporal scalability. Temporal scalability is used to increase the frame rate, or temporal resolution, of an encoded sequence. In video compression it if often necessary to drop source frame from being coded in order to meet the bandwidth requirements of the channel. This results in the decrease of the overall encoded frame rate, and the lowering of the output temporal resolution. This low encoded frame rate can become perceptibly displeasing especially in high motion sequences where it will appear as "jerky" motion similar to a "snapshot" effect. In these cases, temporal scalability can be used to increase the frame rate by encoding those frames not previously encoded in the previous layer as shown in FIG. 2. Thus while the base layer may be encoded at low frame rate, the base layer combined with the enhancement layer(s) will result in a temporally smoother sequence.

Temporal scalability in MPEG-2 has been discussed in [H. Sun and W. Kwok. MPEG Video Coding with Temporal Scalability. *International Communications Conference*, Vol 2952, pages 1742–1746. IEEE, 1995]. Here, the base and enhancement layers are developed jointly such that the total overall bitrate is constant but the rate for the base and enhancement layers are variable. Other investigations on temporal scalability have been outside the scope of the video coding standards and can be found in [J. B. Lee and A. Eleftheriadis. Motion Adaptive Model-Assisted Compatible Coding with Spatio-temporal Scalability. *Proc. SPIE Conf. On Visual Communications and Image Processing*, Vol. 3024, pages 622–634. SPIE, 1997] and [B. Girod and U. Horn. A Scalable Codec for Internet Video Streaming. *DSP'97*, pages 221–224. DSP, 1997].

In light of the foregoing, there is an unmet need in the art for a technique that provides a mechanism for both spatial and temporal enhancements in digital video, when temporal scalability and SNR scalability are combined. There is a further need in the art for selecting the type of scalability and the degree to which that type will be used.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
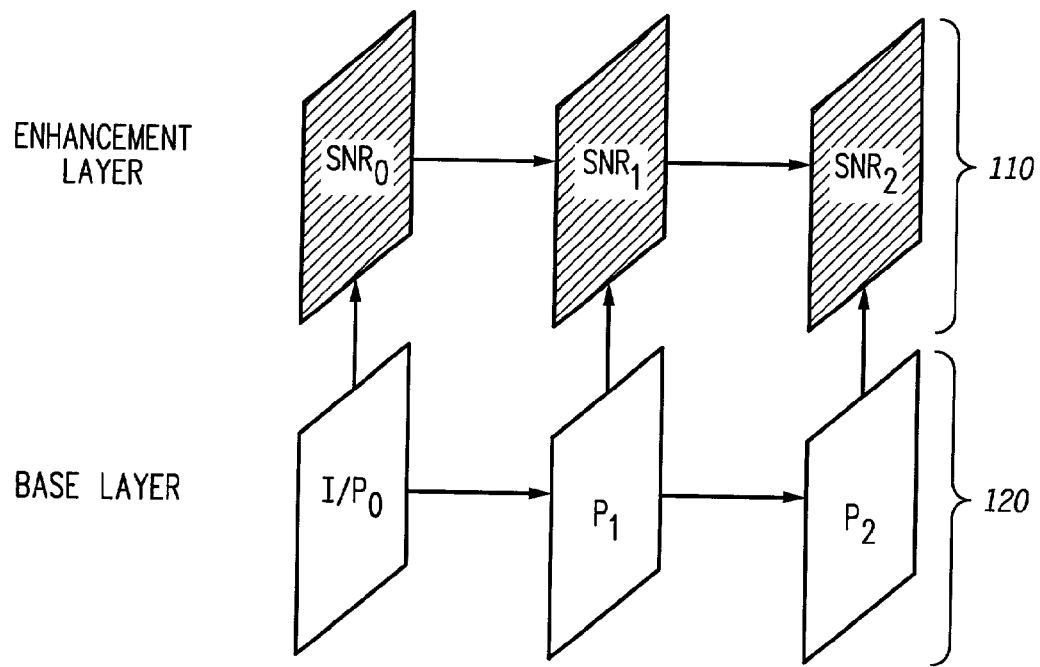
FIG. 1 is a general description of SNR scalability showing 2 layers, according to the prior art

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 2:
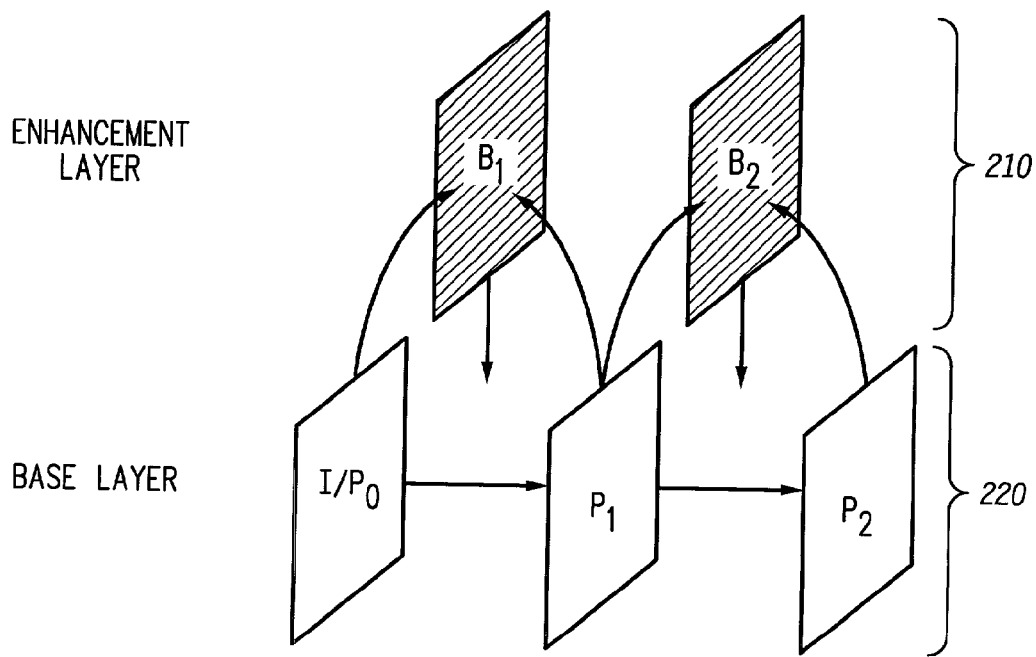
FIG. 2 is a general description of temporal scalability showing 2 layers, according to the prior art

In FIG. 1 a general description of SNR scalability 100 is shown. It is seen that an enhancement layer 110 is built using one or more frames from a base layer 120. In the preferred embodiment of the present invention, additional enhancement layers may be coupled to enhancement layer 110 although it is also possible for one or more enhancement layers to be coupled directly to base layer 120 without departing from the spirit and scope of the present invention. Referring to FIG. 2, according to the prior art, a general description of temporal scalability 200 is shown where in an enhancement layer 210, one or more temporal scaleable frames are coded between previously coded frames in a lower layer 220. While in FIG. 1 and FIG. 2 two layers are shown, in the preferred embodiment of the present invention there is no restriction on the allowable number of enhancement layers. Furthermore, it should be noted that the scope of this invention is not limited to any one video coding strategy. The selection mechanism is not linked to any particular technique used to create the enhancement scaleable data.

Figure 3:
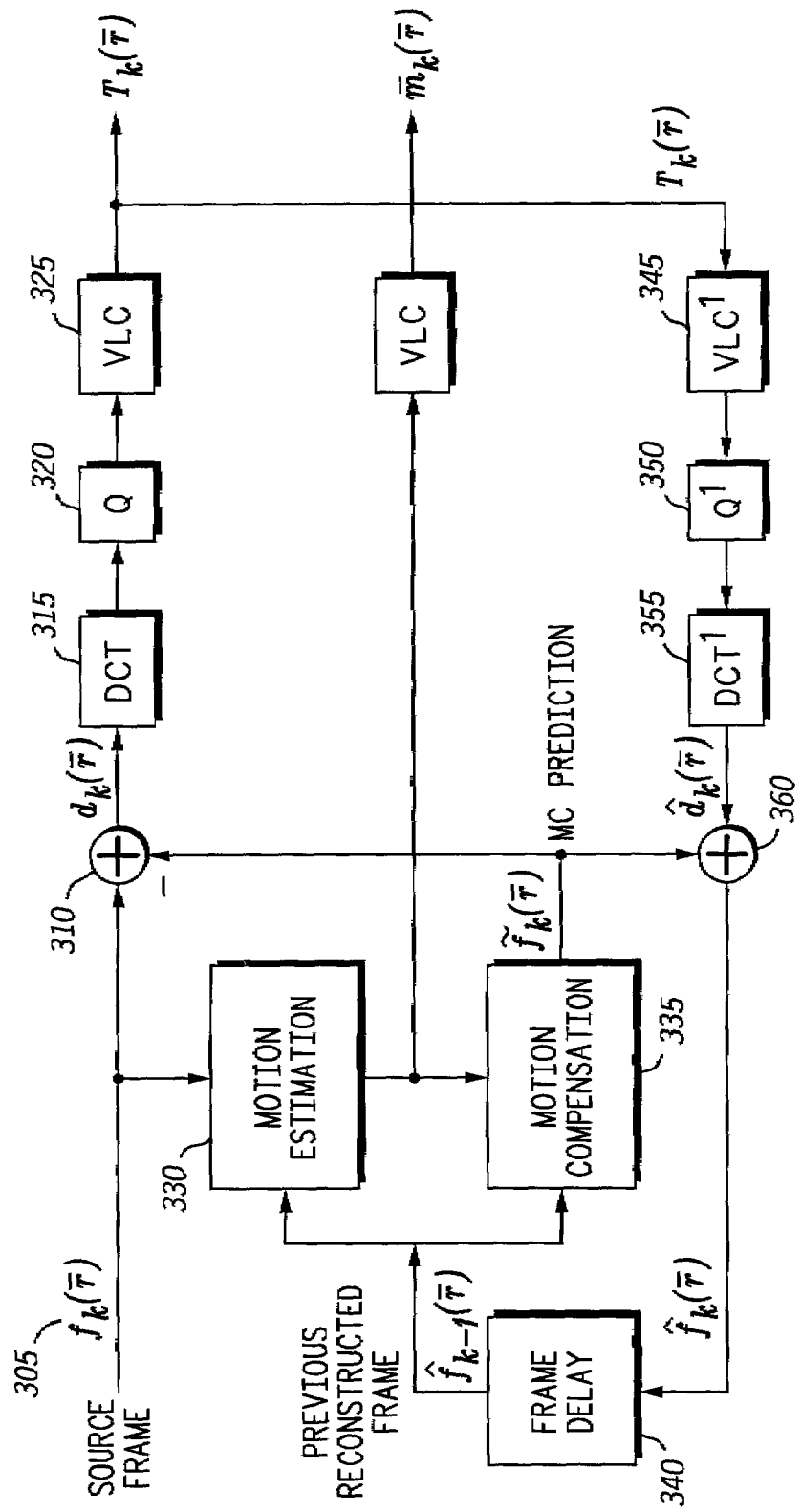
FIG. 3 is a general hybrid Motion Compensated-Discrete Cosine Transform (MC-DCT) video codec, according to the prior art.

Referring now to FIG. 3, a typical video compression system is shown according to the prior art. The video compression system is referred to as a hybrid Motion Compensated Discrete Cosine Transform (MC-DCT) codec 300 and is the basis for many of the video coding standards. A source frame $f_k(r)$ 305 is encoded as the difference between itself and the motion compensated previously reconstructed frame at summer 310. This difference $d_k(r)$ is called the Displaced Frame Difference (DFD) and represents the amount of information remaining after motion prediction and compensation. Once the DFD is obtained a discrete cosine transform(DCT) 315 is applied, the output is then quantized 320 and variable length coded 325 to further reduce the amount of transmitted information and produce the output $T_k(r)$. While the motion prediction 330 and compensation 335 attempt to reduce the temporal redundancies in a digital video sequence, the process of quantization 320 and coding 325 are aimed at reducing the spatial redundancies within the DFD.

In order to regenerate the frame as seen by a decoder, the output $T_k(r)$ of variable length coder 325 is applied to an inverse variable length coder 345, an inverse quantiser 350 and an inverse DCT 355. This gives the reconstructed difference frame $d_k'(r)$ at summer 360. The motion compensated 335 previous frame is then added at summer 360 to produce a reconstructed frame $f_k'(r)$. The reconstructed frame is passed through a frame delay 340 to produce the previous reconstructed frame $f'k_{-1}(r)$. The previous reconstructed frame and the current frame are used by motion estimator 330 to determine how the current frame should be aligned with the previous reconstructed frames to minimize the difference between them. Motion compensator 335 is used to align the current frame and produces motion compensated frame.

The process of quantization is a lossy procedure that results in information being lost. The coarser the quantizer, the more information that is lost. It is from this step that degradations in the resulting video arise. The amount of information lost after quantization is called the coding error, or the residual error. SNR scalability aims to re-encode this coding error in an enhancement layer so that when added to the already coded data, the distortions will be lessened. In multi-layer SNR scalability the coding error remaining after the combinations of all the previous layers is encoded in the next enhancement layer. In each enhancement layer, the remaining coding error is encoded.

To meet bandwidth requirements not all source frames are always coded. This loss in the number of encoded frames, while being displeasing to the viewer can also result in objects appearing in only a small number of frames being lost altogether. Temporal scalability aims to code those frames that were dropped in the previous layer in an enhancement layer(s) as shown in FIG. 2. This is the method in which temporal scalability is accomplished in many of the video coding standards. As in SNR scalability, multiple layers of temporal scalability can be generated with each layer consisting of those frames that have been left uncoded up to the current layer.

Figure 4:
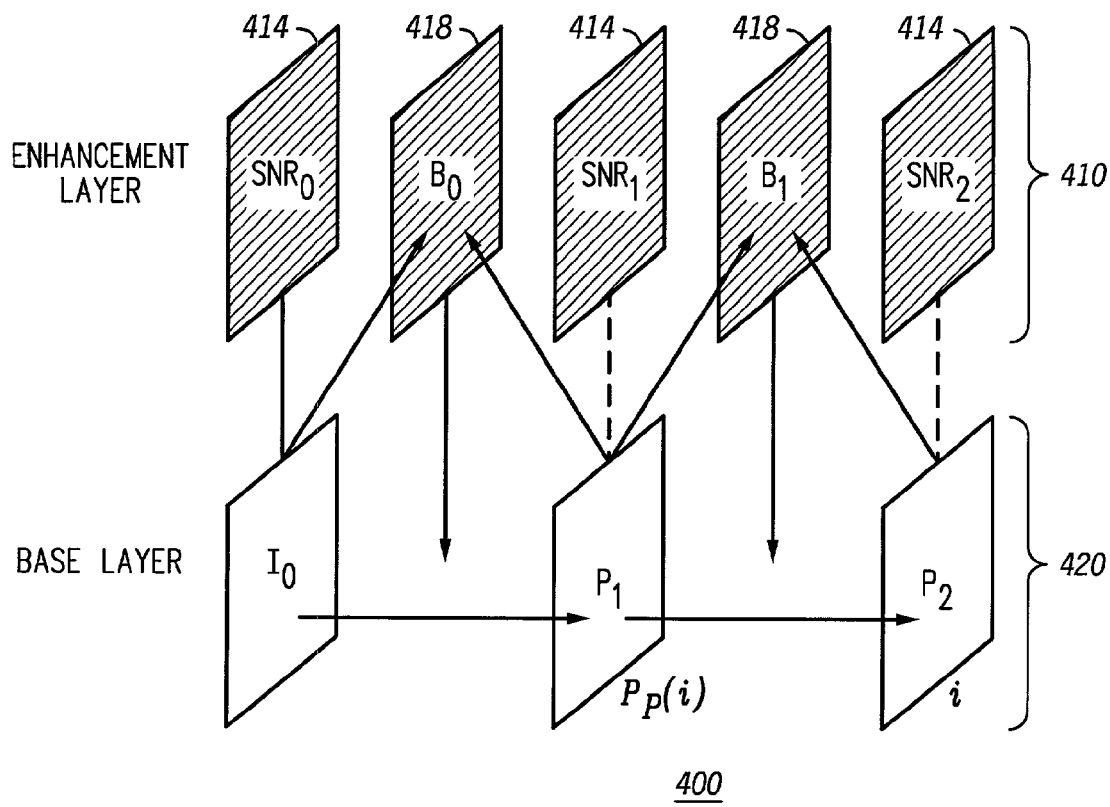
FIG. 4 is a general description of hybrid SNR-temporal scalability in the Enhancement Layer, according to an embodiment of the present invention.

Referring now to FIG. 4, a general description of joint SNR-temporal scalability 400 is shown according to an embodiment of the present invention. The approach to joint SNR-temporal scalability comprises a hybrid enhancement layer 410 that comprises one or more SNR frames 414 and one or more temporal enhancement frames 418. The hybrid enhancement layer 410 is coupled to a base layer 420. In enhancement layer 410 the one or more SNR enhancement frames 414 coexist with the one or more temporal enhancement frames 418. Thus in the enhancement layer 410 not only will there be some enhancement data providing SNR improvements, but temporal enhancement as well. If a temporal enhancement frame of the one or more temporal enhancement frames 418 is selected rather than an SNR enhancement frame of the one or more SNR enhancement frames 414, then the preferred embodiment of the present invention replicates a copy of an SNR enhancement frame from the previous layer to the current enhancement layer 410.

The selection to use temporal enhancement frame or a SNR enhancement frame at a given point in the enhancement layer 410 is based on a combination of one or more criteria. Four criteria are listed below, although it is noted that one of skill in the art will recognize that other criteria may also be applicable:
Motion
Frame Separation
Visual quality gain with SNR scalability
Bitrate of the enhancement layer Motion is an important criteria since the temporal continuity of a video sequence is greatly affected by the extent of motion within the encoded frames. As with motion, frame separation is also an important criteria as a large separation between two encoded frames can lead to a "snap-shot" effect where the decoder will hold the decoded frame in the display for a long time. Visual quality gain is a third criteria useful for joint SNR-Temporal scalability. In the hybrid enhancement layer 410 there is a tradeoff between SNR and temporal enhancement data as the number of bits for this layer are most often limited. If a temporal enhancement frame of the one or more temporal enhancement frames 418 is selected at a particular point in the hybrid enhancement layer, the available bits at this point will be used to code this temporal enhancement frame. Thus at this point, there will not be enough bits for any SNR enhancement data. In the preferred embodiment the course of action at this point is to replicate the encompassing frames from the previous layer in the current enhancement layer 410. By selecting the temporal enhancement frame, SNR resolution that would have resulted if an SNR enhancement frame had been selected instead is sacrificed. This is a loss in the visual quality of the video that is incurred by adding temporal resolution and is referred to as the visual quality gain with SNR scalability. This loss in SNR quality in favor of temporal quality needs to be evaluated when deciding on the type of scalability to use at a particular point in the encoding. A fourth criterion used for determining temporal enhancement over SNR is a bitrate constraint on the enhancement layer(s).

The decision mechanism to select between a temporal or SNR enhancement frame is based on a metric using one or more service functions and a threshold. The one or more service functions are based on models that emulate the behavior of the one or more criteria in deciding which form of scalability to use. The decision is based on the comparison of the metric to a predefined or adaptively computed threshold. In the enhancement layer, assume that frame i is the most recently encoded frame in the previous layer, and $p_p(i)$ is the coded frame prior to this frame in the same layer, the functional value at frame i, F(i), is then formulated as $$F(i)=\alpha F_M(p_p(i),i)+\beta F_s(p_p(i),i)-\lambda F_{SNR}(i)+\gamma F_R \quad (1)$$

where $F_M(p_p(i),i)$, $F_s(p_p(i),i)$, $F_{SNR}(i)$, $F_R$ are the motion, frame separation, SNR visual quality gain, and bitrate service functions, respectively. Here, $\alpha$, $\beta$, $\lambda$, and $\gamma$ are the coefficient weights of each of the service functions. Using this functional, the decision as to the type of scalability to use at frame i is given as:

$F(i)<F_{TH}$ SNR Scalability $F(i)>F_{TH}$ Temporal Scalability  (2)

with $F_{TH}$ being a predefined or adaptively computed threshold. If temporal scalability is selected a temporal enhancement frame is placed temporally between the current frame, i, and the previous encoded frame, $p_p(i)$, in the enhancement layer 410.

Figure 5:
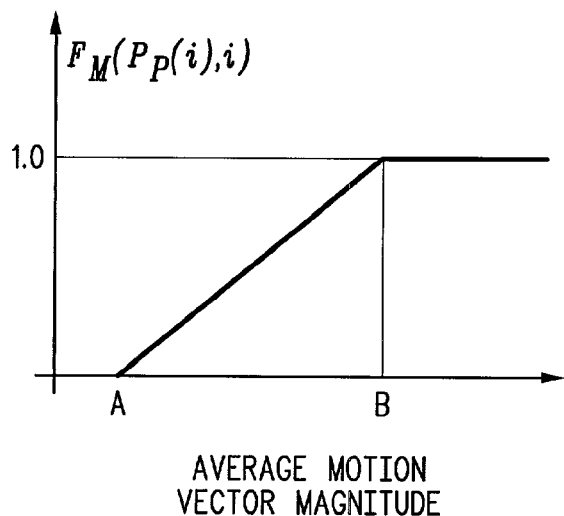
FIG. 5 is an example of a Motion Service Function that can be used in this invention, according to an embodiment of the present invention.
Figure 6:
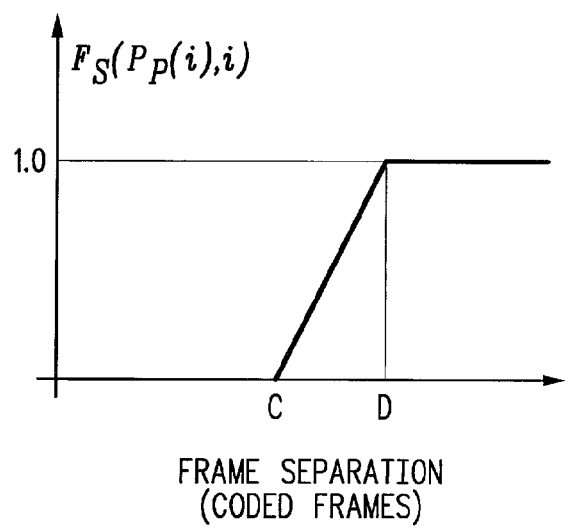
FIG. 6 is an example of a Frame Service Function than can be used in this invention, according to an embodiment of the present invention.

The models for individual service functions can be based on the desired nature of the contribution of the above characteristics. The motion and the frame separation service functions shown in the preferred embodiment in FIG. 5 and FIG. 6 are exemplary and may be alternatively defined without limiting the scope of this invention. To wit, the use of variables A, B, C, and D in these figures are exemplary of example functions; the user or application can define them as needed and/or desired. In the model shown for the motion in FIG. 5, the average motion vector magnitude is used. As the average motion vector magnitude increases, the value of the functional increases. Alternative models for the motion may use other measures for the motion such as the maximum motion vector magnitude. The frame separation service function shown in FIG. 6 exhibits the same behavior although it can be defined in an alternative manner. Without limiting the scope of this invention the preferred embodiment assumes the use of a Peak Signal to Noise Ratio (PSNR) as a measure for the SNR visual quality gain. Using the PSNR value, the SNR visual quality service function used in the preferred embodiment is $$F_{SNR}(i)=PSNR_{EnhancementLayer}(i)-PSNR_{PrevLayer}(i) \quad (3)$$

where the $PSNR_{EnhancementLayer}$ (i) is the PSNR value obtained by coding frame i using SNR scalability in the current layer and $PSNR_{PrevLayer}$ (i) is the PSNR value obtained for frame i in the lower layer. A bitrate service function used in the preferred embodiment is the bitrate of the enhancement layer itself. Without limiting the scope of the invention, in the preferred embodiment $F_R$=Bitrate Enhancement Layer  (4)

These service functions can be implemented in the form of lookup tables or encoded as functions within the application. The threshold and coefficients are operable to be adjustable based upon how preferred a particular form of scalability is.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for the utilization of one or more scalability techniques operable to enhance one or more digital video frames of a base layer of a digital video system, comprising:
   one or more enhancement layers, wherein at least a first enhancement layer of the one or more enhancement layers is coupled to the base layer and is operable to be coupled to every other enhancement layer, and wherein each enhancement layer of the one or more enhancement layers comprises one or more enhanced frames of digital video;
   a first sequence of one or more enhanced frames, said first sequence operable to be enhanced by selection of one or more scalability techniques;
   for each of the one or more scalability techniques, a mechanism for determining a number of the one or more enhanced frames of the first sequence that correspond to a scalability technique of the one or more scalability techniques; and
   wherein a scalability technique of the one or more scalability techniques is selected based upon the following criteria:
   a motion function,
   a frame separation function,
   a visual quality gain with a SNR scalability function, and
   a bitrate of the enhancement layer function.

2. The structure of claim 1, wherein two of the one or more scalability techniques are SNR scalability and temporal scalability.

3. The structure of claim 1, wherein each enhancement layer of the one or more enhancement layers comprises one or more SNR frames and one or more temporal frames.

4. The structure of claim 1, wherein each scalability technique of the one or more scalability techniques is operable to use frames from the one or more enhancement layers.

5. The structure of claim 1, wherein the one or more scalability techniques is selected in accordance with a comparison of a metric of the one or more scalability techniques to a threshold.

6. The structure of claim 5, wherein the metric further comprises:
   within an enhancement layer of the one or more enhancement layers, if a frame i is a current frame encoded in a previous layer, and $p_p(i)$ is a previously coded frame in the previous layer, the metric of the frame i, F (i), is formulated as $$F(i) = \alpha F_M(p_p(i),i) + \beta F_s(p_p(i),i) - \lambda F_{SNR}(i) + \gamma F_R$$

where $F_M(p_p(i),i)$ is a motion function, $F_s(p_p(i),i)$ is a frame separation function, $F_{SNR}(i)$ is an SNR visual quality function, $F_R$ is a bitrate service function, and $\alpha$, $\beta$, $\lambda$, and $\gamma$ are corresponding coefficient weights of one or more of the motion function, the frame separation function, the visual quality gain with the SNR scalability function, and the bitrate of the enhancement layer function.

7. The structure of claim 6, wherein what scalability technique of the one or more scalability techniques to use at frame i is determined in accordance with:
   if $F(i) < F_{TH}$ use a first scalability technique of the one or more scalability techniques; and
   if $F(i) > F_{TH}$ use a second scalability technique of the one or more scalability techniques.

8. The structure of claim 7, wherein the first scalability technique is SNR scalability and the second scalability technique is temporal scalability.

9. The structure of claim 6, wherein as an average motion vector magnitude increases, a value of the motion function also increases.

10. The structure of claim 6, wherein as a frame separation magnitude increases, a value of the frame separation function also increases.

11. The structure of claim 6, wherein the SNR visual quality service function is defined as $$F_{SNR}(i) = PSNR_{EnhancementLayer}(i) - PSNR_{PrevLayer}(i)$$

where a $PSNR_{EnhancementLayer}(i)$ is a Peak Signal to Noise Ratio (PSNR) value obtained by encoding the current frame i using SNR scalability in the enhancement layer and $PSNR_{PrevLayer}(i)$ is a Peak Signal to Noise Ratio (PSNR) obtained for frame i in the previous layer.

12. The structure of claim 6, wherein the bitrate service function is a bitrate of the enhancement layer.

13. The structure of claim 1, wherein if an enhancement frame of the one or more enhancement frames is selected and is not an SNR enhancement frame, then a copy of an SNR enhancement frame from a previous layer is replicated to a current layer at the same time instance as in the previous layer.

14. A structure for the utilization of SNR scalability and temporal scalability operable to enhance one or more digital video frames of a base layer of a digital video system, comprising:
   one or more enhancement layers, wherein at least one enhancement layer of the one or more enhancement layers is coupled to the base layer and is operable to be coupled to every other enhancement layer, and wherein each enhancement layer of the one or more enhancement layers comprises one or more temporal enhanced frames and one or more SNR enhanced frames; and
   a first sequence of one or more enhanced frames, said first sequence operable to be enhanced by selection of the one or more SNR enhanced frames and the one or more temporal enhanced frames;
   wherein the one or more SNR enhanced frames and one or more temporal enhanced frames are operable to be selected based upon the following criteria;
   a motion function,
   a frame Separation function,
   a visual quality gain with a SNR scalability function, and
   a bitrate of the enhancement layer function.

15. The structure of claim 14, wherein a metric is operable to select the one or more SNR enhanced frames and the one or more temporal enhancement frames, said metric comprising:
   within an enhancement layer of the one or more enhancement layers, if a frame; is a current frame encoded in a previous layer, and $p_p(i)$ is the previously coded frame in that layer, the metric of the frame i, F (i), is formulated as $$F(i) = \alpha F_M(p_p(i),i) + \beta F_s(p_p(i),i) - \lambda F_{SNR}(i) + \gamma F_R$$

where $F_M(p_p(i),i)$ is a motion function, $F_s(p_p(i),i)$ is a frame separation function, $F_{SNR}(i)$ is an SNR visual quality function, $F_R$ is a bitrate service function, and $\alpha$, $\beta$, $\lambda$, and $\gamma$ are the corresponding coefficient weights of one or more of the motion function, the frame separation function, the visual quality gain with the SNR scalability function, and the bitrate of the enhancement layer function.

16. The structure of claim 15, wherein a scalability technique to use at frame i is determined by
   if $F(i) < F_{TH}$ use a SNR enhancement technique; and
   if $F(i) > F_{TH}$ use a temporal enhancement technique.

17. The structure of claim 15, wherein as an average motion vector magnitude increases, the value of the motion function also increases.

18. The structure of claim 15, wherein as a frame separation magnitude increases, the value of the frame separation function also increase.

19. The structure of claim 15, wherein the SNR visual quality service function is defined as $$F_{SNR}(i) = PSNR_{EnhancementLayer}(i) - PSNR_{PrevLayer}(i)$$

where a $PSNR_{EnhancementLayer}(i)$ is a Peak Signal to Noise Ratio (PSNR) value obtained by encoding the current frame i using SNR scalability in the enhancement layer and $PSNR_{PrevLayer}(i)$ is a Peak Signal to Noise Ratio (PSNR) obtained for frame i in the previous layer.

20. The structure of claim 15, wherein the bitrate service function is the bitrate of the enhancement layer.

21. The structure of claim 14, wherein if an enhancement frame of the one or more enhancement frames is selected and is not an SNR enhancement frame, then a copy of an SNR enhancement frame is replicated from a previous layer to a current layer.

22. A method for the utilization of one or more scalability techniques operable to enhance one or more digital video frames of a base layer of a digital video system, further comprising:
   coupling at least one enhancement layer of one or more enhancement layers to the base layer, wherein each enhancement layer of the one or more enhancement layers is operable to be coupled to every other enhancement layer of the one or more enhancement layers and comprises one or more enhanced frames of digital video;
   enhancing a first sequence of one or more enhanced frames by selection of one or more scalability techniques;
   for each of the one or more scalability techniques, determining a number of the one or more enhanced frames of the first sequence that correspond to a scalability technique of the one or more scalability techniques; and
   wherein a scalability technique of the one or more scalability techniques is selected based upon the following criteria:
      a motion function,
      a frame separation function,
      a visual quality gain with a SNR scalability function, and
      a bitrate of the enhancement layer function.

23. The method of claim 22, wherein selection of the one or more scalability techniques is performed in accordance with a comparison of a metric of the one or more scalability techniques to the threshold.

24. The method of claim 22, wherein the metric further comprises:
   within an enhancement layer of the one or more enhancement layers, if a frame i is a current frame encoded in a previous enhancement layer, and $p_p(i)$ is a previously coded frame in the previous enhancement layer, the metric of the frame i, F (i), is formulated as $$F(i) = \alpha F_M(p_p(i),i) + \beta F_s(p_p(i),i) - \lambda F_{SNR}(i) + \gamma F_R$$

where $F_M(p_p(i),i)$ is a motion function, $F_s(p_p(i),i)$ is a frame separation function, $F_{SNR}(i)$ is an SNR visual quality function, $F_R$ is a bitrate service function, and $\alpha$, $\beta$, $\lambda$, and $\gamma$ are corresponding coefficient weights of one or more of the motion function, the frame separation function, the visual quality gain with the SNR scalability function, and the bitrate of the enhancement layer function.

25. The method of claim 24, wherein if an enhancement frame of the one or more enhancement frames is selected, further comprising:
   replicating a copy of an SNR enhancement frame from a previous layer to a current layer.

26. A method for the utilization of SNR scalability and temporal scalability operable to enhance one or more digital video frames of a base layer of a digital video system, comprising:
   coupling at least one enhancement layer of one or more enhancement layers to the base layer, wherein each enhancement layer of the one or more enhancement layers is operable to be coupled to every other enhancement layer of the one or more enhancement layers and comprises one or more temporal enhanced frames and one or more SNR enhanced frames; and
   enhancing a first sequence of one or more enhanced frames by selection of the one or more SNR enhanced frames and the one or more temporal enhanced frames;
   selecting the one or more SNR enhanced frames and the one or more temporal enhanced frames based upon one or more criteria, said criteria comprising one or more of
   a motion function,
   a frame Separation function,
   a visual quality gain with a SNR scalability function; and
   a bitrate of the enhancement layer function; and
   wherein if an enhancement frame of the one or more enhancement frames is selected, replicating a copy of an SNR enhancement frame from a previous layer to a current layer.

27. A method for utilization of SNR scalability and temporal scalability operable to enhance one or more digital video frames of a base layer of a digital video system, the method comprising the steps of:
   determining one or more scalability techniques to enhance the one or more digital video frames; and
   enhancing the one or more digital video frames with the scalability technique; and
   wherein a scalability technique of the one or more scalability techniques is selected based upon the following criteria:
      a motion function,
      a frame separation function,
      a visual quality gain with a SNR scalability function, and
      a bitrate of the enhancement layer function.

* * * * *